(12) United States Patent
Aydin et al.

(10) Patent No.: US 7,608,965 B2
(45) Date of Patent: Oct. 27, 2009

(54) FIELD CONTROLLED AXIAL FLUX PERMANENT MAGNET ELECTRICAL MACHINE

(75) Inventors: Metin Aydin, Peoria, IL (US); Thomas A. Lipo, Middleton, WI (US); Surong Huang, Shanghai (CN)

(73) Assignee: Wisconsin Alumni Research Foundation, Madison, WI (US)

( * ) Notice: Subject to any disclaimer, the term of this patent is extended or adjusted under 35 U.S.C. 154(b) by 318 days.

(21) Appl. No.: 11/218,316

(22) Filed: Sep. 1, 2005

(65) Prior Publication Data

US 2007/0046124 A1 Mar. 1, 2007

(51) Int. Cl.
*H02K 21/12* (2006.01)

(52) U.S. Cl. .................. 310/156.32; 210/266

(58) Field of Classification Search ............ 310/156.08, 310/266, 267, 268
See application file for complete search history.

(56) References Cited

U.S. PATENT DOCUMENTS

| | | | |
|---|---|---|---|
| 3,979,620 A | 9/1976 | Whiteley | |
| 5,124,604 A | 6/1992 | Swartz | |
| 5,177,392 A | 1/1993 | Scott | |
| 5,220,228 A | 6/1993 | Sibata | |
| 5,260,616 A * | 11/1993 | Mizutani et al. | 310/49 R |
| 5,455,473 A | 10/1995 | Lipo et al. | |
| 5,656,880 A | 8/1997 | Clark | |
| 5,710,476 A | 1/1998 | Ampela | |
| 5,744,896 A | 4/1998 | Kessinger, Jr. et al. | |
| 5,767,600 A | 6/1998 | Whiteley | |
| 5,789,841 A | 8/1998 | Wang | |
| 5,821,710 A | 10/1998 | Masuzawa et al. | |
| 5,875,540 A | 3/1999 | Sargeant et al. | |
| 6,057,622 A | 5/2000 | Hsu | |
| 6,144,126 A | 11/2000 | Kodama | |
| 6,201,334 B1 | 3/2001 | Sargeant et al. | |
| 6,373,162 B1 | 4/2002 | Liang et al. | |
| 6,411,002 B1 | 6/2002 | Smith et al. | |
| 6,445,105 B1 | 9/2002 | Kilman et al. | |
| 6,462,430 B1 | 10/2002 | Joong et al. | |

(Continued)

OTHER PUBLICATIONS

Lipo, et al., "Field Weakening of Permanent Magnet Machines—Design Approaches," EPE Power Electronics and Motion Control Conference (EPE-PEMC 04), Sep. 2004, Riga, Latvia.

(Continued)

*Primary Examiner*—Nguyen N Hanh
(74) *Attorney, Agent, or Firm*—Foley & Lardner LLP

(57) ABSTRACT

An electrical machine is provided. The machine includes at least one rotor mounted for rotation about a central axis and at least two stator sections mounted axially adjacent to and on opposite sides of the rotor. The rotor includes two circumferentially arrayed rows of alternating segments of permanent magnet and ferromagnetic pole pieces. One of the rows is spaced radially inwardly from the other row. The permanent magnet and ferromagnetic pole pieces are separated by a non-ferromagnetic material. The pole pieces are arranged so that the permanent magnet segments in the first row are radially adjacent to ferromagnetic segments in the second row so that the N-S magnetic fields of the permanent magnet segments are aligned axially. Each stator section includes a ferromagnetic stator frame, at least a first AC winding wound in circumferential slots in the stator frame, and a DC field winding wound on the stator frame.

19 Claims, 8 Drawing Sheets

U.S. PATENT DOCUMENTS

| | | | |
|---|---|---|---|
| 6,472,792 | B1 | 10/2002 | Jack et al. |
| 6,541,877 | B2 | 4/2003 | Kim et al. |
| 6,577,022 | B2 | 6/2003 | Joong et al. |
| 6,651,309 | B2 | 11/2003 | Gay et al. |
| 6,657,329 | B2 | 12/2003 | Kastinger et al. |
| 6,676,891 | B1 | 1/2004 | Jack |
| 6,713,924 | B1 | 3/2004 | Fukushima |
| 6,803,694 | B2 * | 10/2004 | Decristofaro et al. ....... 310/216 |
| 6,809,453 | B2 | 10/2004 | Narita et al. |
| 2002/0145351 | A1 | 10/2002 | Horng et al. |
| 2003/0122442 | A1 | 7/2003 | Jack et al. |
| 2003/0193264 | A1 | 10/2003 | Pyntikov et al. |
| 2004/0074079 | A1 | 4/2004 | Jack et al. |
| 2004/0090140 | A1 | 5/2004 | Lai et al. |
| 2004/0245879 | A1 | 12/2004 | Hirzel et al. |
| 2005/0029899 | A1 | 2/2005 | Irving et al. |

OTHER PUBLICATIONS

Aydin, et al., "Performance Evaluation of an Axial Flux Consequent Pole PM Motor Using Finite Element Analysis," IEEE International Conference on Electrical Machines and Drives, Madison, WI 2003.

Aydin, et al., "A New Axial Flux Surface Mounted Permanent Magnet Machine Capable of Field Control," IEEE Industry Applications Society Annual Meeting, 2002, pp. 1250-1257.

Lipo, et al., "Soft Magnetic Composites for AC Machines—A Fresh Perspective," Power Electronics and Motion Control (PEMC) Conference, Sep. 2-4, 2004, Riga, Latvia.

Lipo, et al., "A New Modular Motor Concept with Sinusoidally Shaped Poles," Electric Machine Technology Symposium (EMTS), Adam's Mark Hotel, Philadelphia, PA, Jan. 28, 2004.

Jack, et al., "Permanent-Magnet Machines with Powdered Iron Cores and Prepressed Windings," IEEE Transactions on Industry Applications, vol. 36, No. 4, Jul./Aug. 2000, pp. 1077-1084.

White, et al., "Torque Analysis and Cogging Torque Minimization in a Modular Permanent Magnet AC Machine with Concentrated Windings," Proc. of 2003 CPES Power Electronics Seminar, pp. 380-384.

White, et al., "Estimation of Power and Torque Density for Modular PM Machines Employing Soft Magnetic Composite Materials," Proc. of 2004 CPES Power Electronics Seminar, pp. 3-8.

* cited by examiner

FIELD CONTROLLED AXIAL FLUX PERMANENT MAGNET ELECTRICAL MACHINE

This invention was made with United States government support awarded by the following agency: NAVY/ONR N00014-03-1-0924. The United States has certain rights in this invention.

FIELD OF THE INVENTION

This invention pertains generally to the field of electrical machines including motors and generators and particularly to axial air gap permanent magnet machines.

BACKGROUND OF THE INVENTION

There is a continuing need for compact, efficient and less expensive electrical machines that have high torque capability over a large speed range and the ability to control machine speed. This need is particularly significant for electrical drives for vehicles, such as hybrid automobiles, which require high torque at zero and low speed, fast acceleration, and preferably regenerative braking. Permanent magnet machines have drawn increasing attention for their potentially greater capability than conventional AC and DC motors to meet these stringent requirements.

The development of permanent magnet technology, such as the availability of more powerful NdFeB magnets, has resulted in increased power and torque density and greater efficiency for permanent magnet machines generally. Permanent magnet machines are usually more efficient because field excitation losses are eliminated. In addition, copper losses are generally reduced in permanent magnet machines as compared to conventional machines. Due to lower losses, heating in the permanent magnet machines should be less than in conventional machines, which allows either operation of the machine at lower temperatures or an increase in shaft power until the maximum allowable temperature has been reached. Typically, less power is required from the power electronics converter in order to deliver the same power to a permanent magnet machine because of the high efficiency of such machines.

Air gap flux control of permanent magnet machines can generally be accomplished either by control techniques or a suitable modification of the machine structure. Conventional permanent magnet machines have a fixed magnetic excitation, which limits the capability of the power electronic drive. Such machines are operated at constant volt-hertz operation up to a base speed; constant voltage operation at higher speeds requires weakening of the field in order to extend the speed range. Above base speed, vector control techniques are typically used to weaken the air-gap flux. However, these techniques cause large demagnetization current to flow in the machine d-axis, resulting in higher losses and the risk of demagnetization of the permanent magnets. The magnets may ultimately be forced to operate in the irreversible demagnetization region. See, T. M. Jahns, IEEE Trans. on Ind. App., Vol. 23 No. 4, July-August 1987, pp. 681-689; T. Sebastain and G. R. Slemon, IEEE Trans. on Ind. App., Vol. 23 No. 2, March-April 1987, pp. 327-333. Such demagnetization can permanently diminish the torque capacity of the machine. Thus, the attainable speed range is limited by the largest tolerable demagnetization current. In addition, the capability of the electrical power converters sets an additional limit to the flux weakening range of the permanent magnet machine.

Efforts have been made to realize field weakening in permanent magnet machines by eliminating the detrimental effects of d-axis current injection. A number of alternative solutions have been proposed. These include a double salient permanent magnet machine with flux control as shown in U.S. Pat. No. 5,455,473; a double salient permanent magnet machine capable of field weakening, (A. Shakal, et al., IEEE Int. Sym. on Ind. Elect. Conf. Proc., 1993, pp. 19-24); an outer rotor double salient permanent magnet machine (J. Luo, PhD thesis, University of Wisconsin-Madison, 1999); a two-part rotor synchronous permanent magnet machine (B. J. Chalmers, et al., IEEE Proceedings, Vol. 145, No. 2, March 1998, pp. 133-139); a radial flux permanent magnet machine adapted for air gap flux weakening operation (L. Xu, et al., IEEE Trans. on Ind. App., Vol. 31, No. 2, March-April 1995, pp. 373-378); a consequent pole permanent magnet machine (J. A. Tapia, et al., IEEE Int. Conf. on Elect. Machines and Drives, Boston, 2001, pp. 126-131);a hybrid electric machine as shown in U.S. Pat. Nos. 6,462,430, 6,541,877, and 5,777,022; a brushless motor with permanent magnets as shown in U.S. Pat. No. 5,821,710; and a brushless permanent magnet machine with variable axial rotor-stator alignment to increase speed capability as shown in published International Application WO 03077403 A1, 2003.

Axial flux permanent magnet machines have drawn increasing attention within the last decade. They provide certain advantages over conventional radial flux permanent magnet machines, including higher power-torque density and efficiency, more easily adjustable air gaps, and lower noise and vibration levels. Axial flux machines can have a variable air gap which may be suitable for some flux weakening applications such as electric traction. An axial flux machine composed of two slotted stators and a single rotor is discussed in F. Profumo, et al., IEEE Ind. App. Soc. Annual Meeting 1998, pp. 152-158. The slotted side of the stator has a tape wound core with series connected stator windings. The rotor structure has an axially magnetized rotor disk having main and leakage poles. There are two flux barriers between the leakage and main poles. Another axial flux machine with flux control is discussed in U.S. Pat. No. 6,057,622, and in J. S. Hsu, IEEE Trans. on Energy Conversion, Vol. 15, No. 4, December 2000, pp. 361-365. This machine uses a field weakening coil to achieve field weakening by directly controlling the magnitude and polarity of a DC current in the field weakening coil. The rotor is formed by magnet and iron pole pieces which are mounted in holes in a non-magnetic rotor body. The machine has two slotted stators and AC windings, and each stator has a yoke providing a flux return path. Two field weakening coils in toroidal form are mounted on a machine frame. Another axial permanent magnet machine with flux control is described in U.S. Pat. No. 6,373,162. This machine includes two stators and one rotor, with the rotor having permanent magnets and pole portions. The magnets in the rotor generate a first magnetic flux and the consequent rotor poles generate a second magnetic flux. A field coil, which is mounted to the housing and located very close to the rotor, is effective to vary the second magnet flux. A brushless axial flux permanent magnet synchronous alternator is described in N. L. Brown and L. Haydock, IEE Proc. of Elec. Power Appl., Vol. 150, No. 6, November 2003, pp. 629-635.

Flux control capability is an important objective for permanent magnet machines. Unfortunately, surface mounted permanent magnet machines, by their nature, lack the capability to control the flux. What is needed is a surface mounted permanent magnet machine that has the capability to control the flux without over-sizing the machine. What is further needed is a surface mounted permanent magnet machine that has the capability to control the flux in a cost effective manner.

SUMMARY

Exemplary embodiments of the present invention combine a variable DC coil excitation in addition to permanent magnet excitation. The rotor includes two disks mounted on a common shaft, with each disk carrying magnets and alternate north and south iron poles made of steel. This design modifies the multiple-rotor multiple-stator axial flux permanent magnet machine by adding one or two DC field windings, depending on the machine type, to control the air gap flux and to provide a path for the DC flux through a modification of the rotor structure. As a result, the described field controlled axial flux surface mounted permanent magnet machine provides a less expensive and more readily implemented flux control. The described permanent magnet machine is less expensive because a magnet cost per pound is 10 to 15 times more than the cost of copper or steel.

An electrical machine is provided. The machine includes at least one rotor mounted for rotation about a central axis and at least two stator sections mounted axially adjacent to and on opposite sides of the rotor. The rotor includes two circumferentially arrayed rows of alternating segments of permanent magnet and ferromagnetic pole pieces. One of the rows is spaced radially inwardly from the other row. The permanent magnet and ferromagnetic pole pieces are separated by a non-ferromagnetic material. The pole pieces are arranged so that the permanent magnet segments in the first row are radially adjacent to ferromagnetic segments in the second row so that the N-S magnetic fields of the permanent magnet segments are aligned axially. Each stator section includes a ferromagnetic stator frame, at least a first AC winding wound in circumferential slots in the stator frame, and a DC field winding wound on the stator frame.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION OF THE INVENTION

Figure 1:
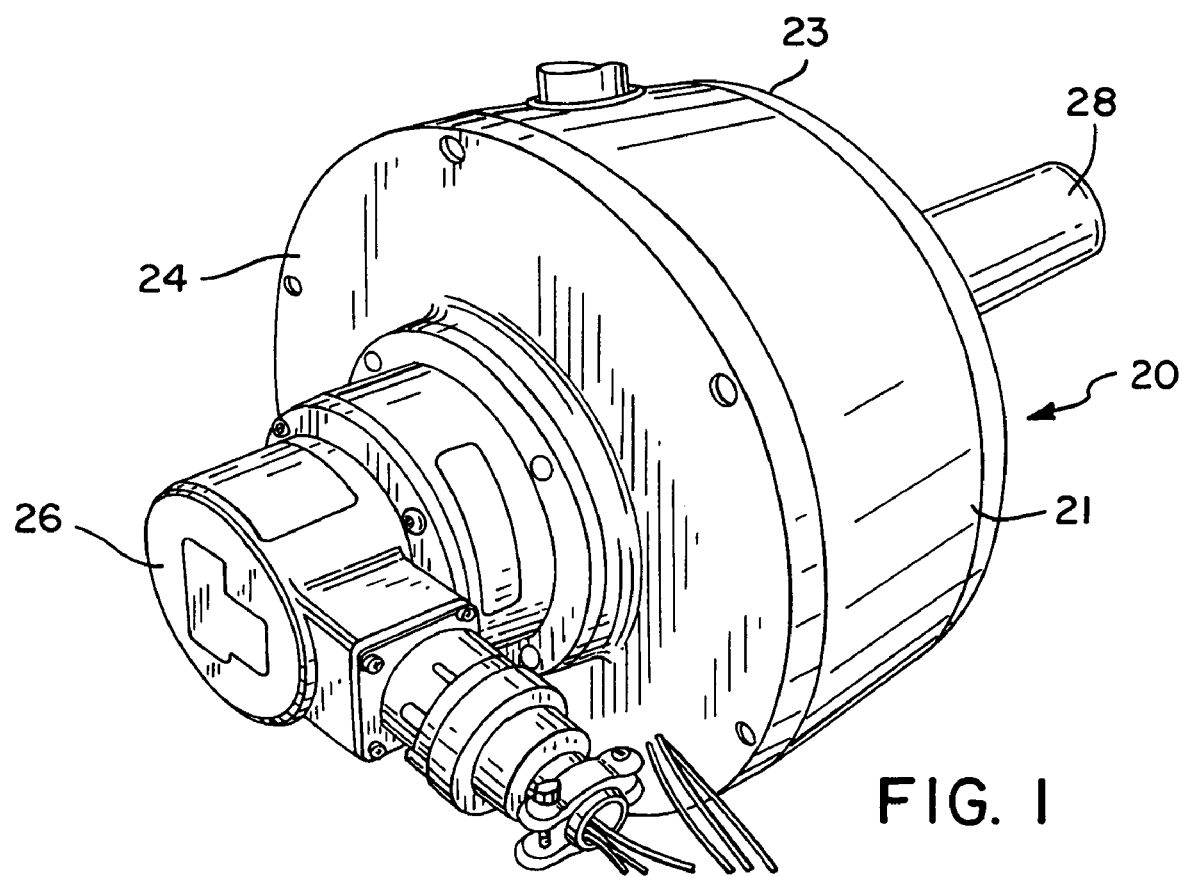
FIG. 1 is an external perspective view of a field controlled axial flux permanent magnetic machine in accordance with the present invention.

A field controlled double stator single rotor axial flux internal rotor permanent magnet machine in accordance with the invention is shown in a perspective view at 20 in FIG. 1. The machine 20 has an external casing 21 connected to a first stator section 23 and to a second stator section 24. Three-phase electrical input supplies power to the machine 20 through an external electrical encoder 26 that detects the position and the speed of the machine 20. A central shaft 28 defining a central axis of the machine is available for connection to supply mechanical power to a drive system, e.g., to the wheels of the vehicle.

Figure 2:
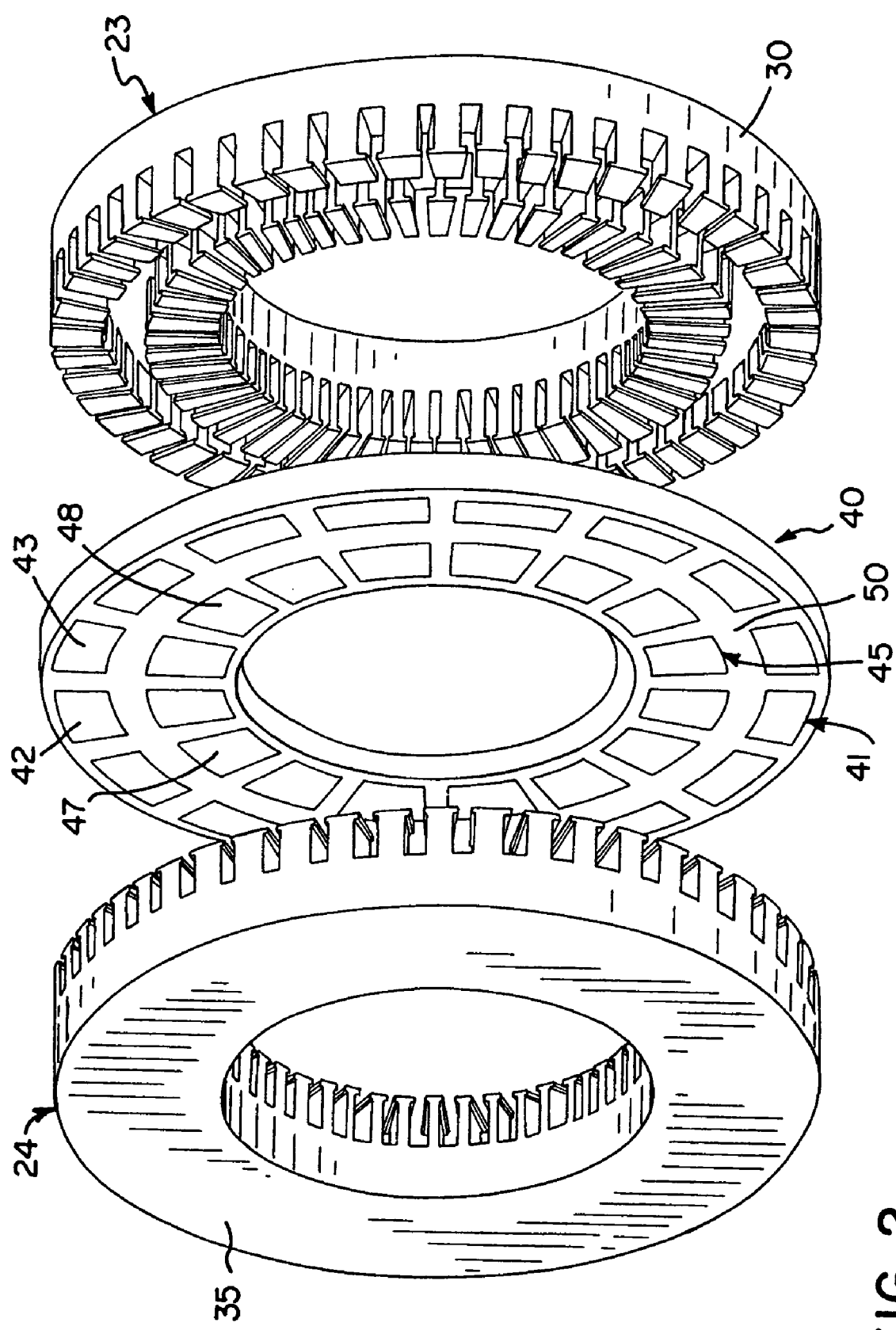
FIG. 2 is a simplified exploded view of an exemplary embodiment of the present invention showing the rotor of the machine of FIG. 1 and two axially adjacent stators.
Figure 3:
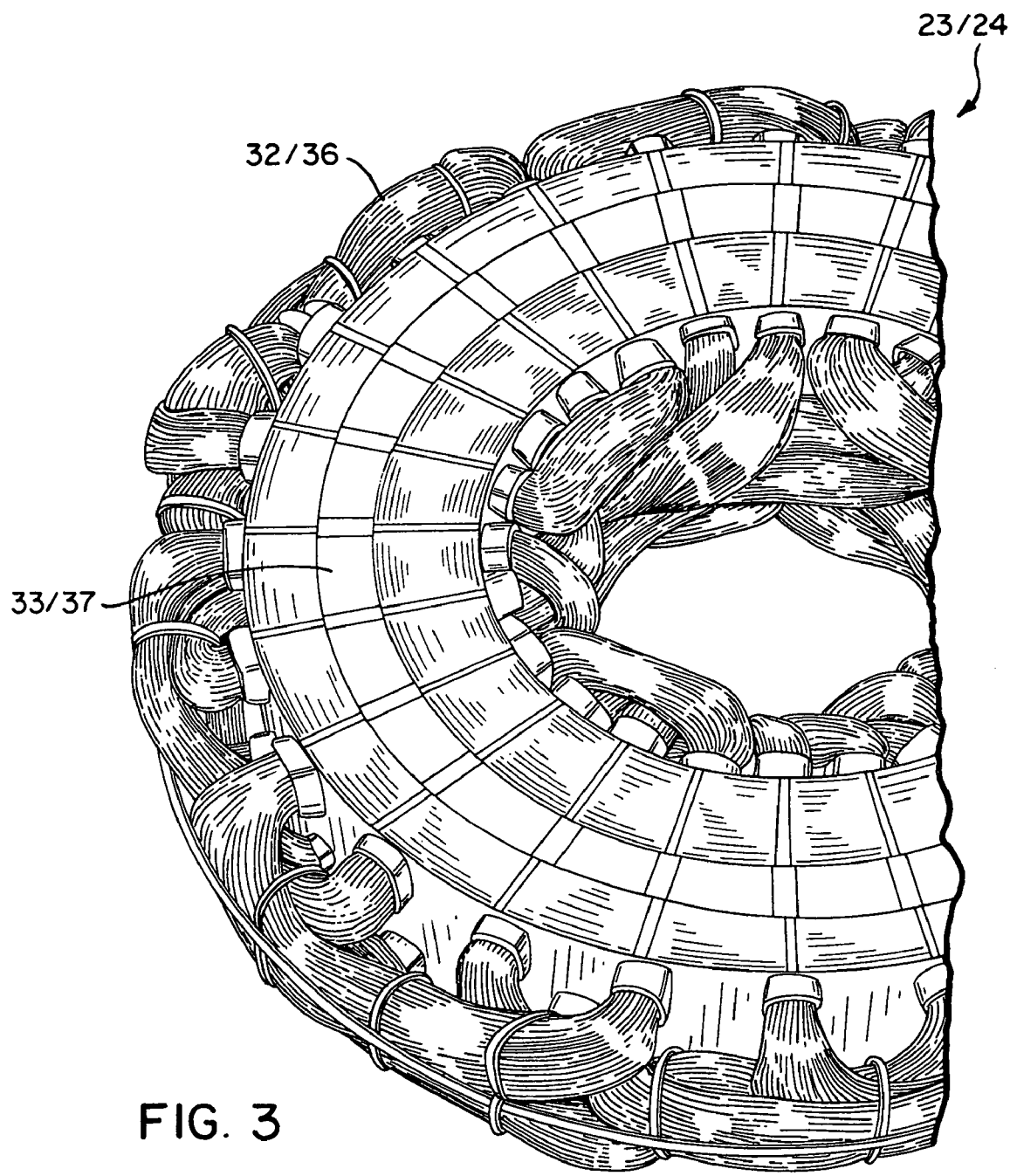
FIG. 3 is an illustrative perspective view of a stator of the machine of FIG. 1.
Figure 4:
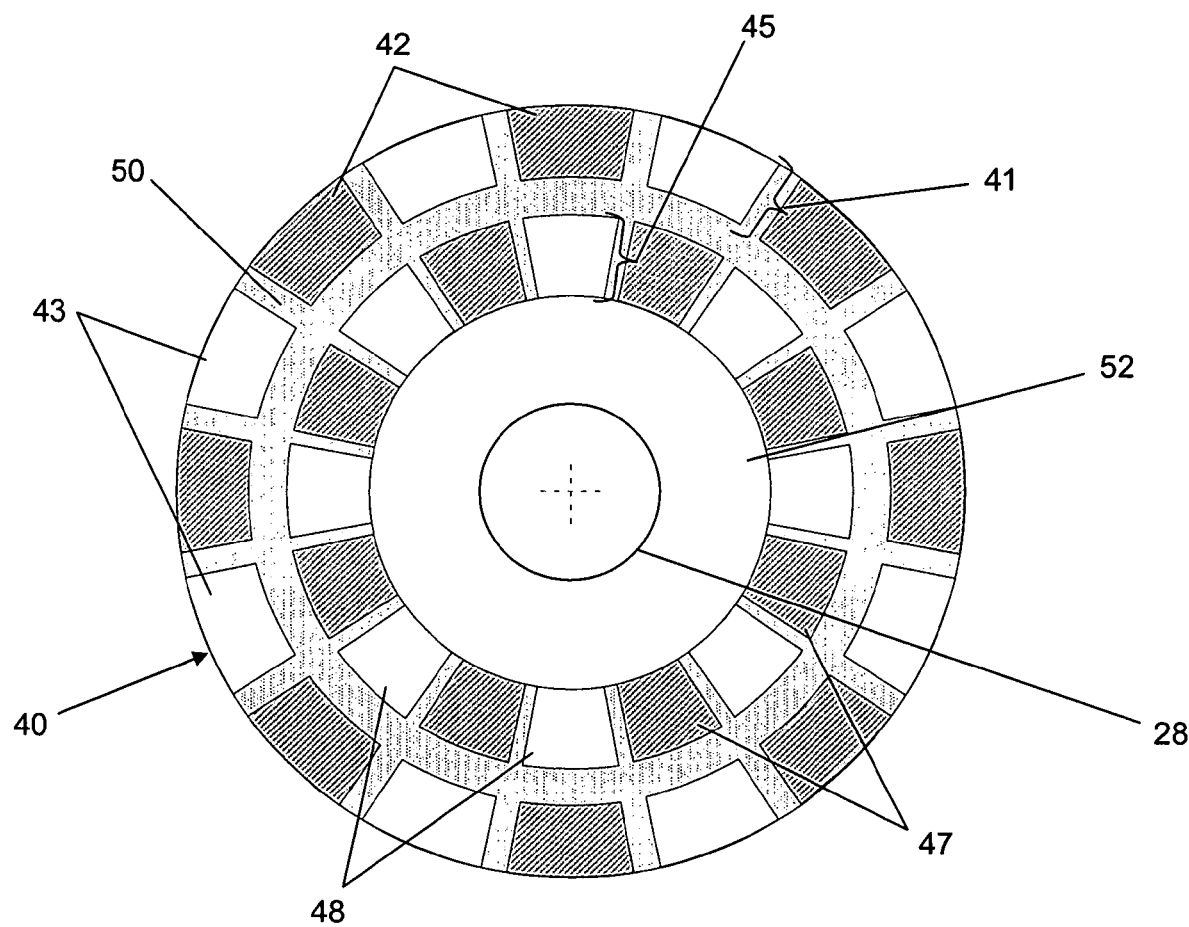
FIG. 4 is a simplified plan view of the rotor of the machine of FIG. 1.

As illustrated in FIGS. 2 and 3, the first stator 23 includes a ferromagnetic stator frame 30 having slots therein in which is wound an AC drive winding 32 and a DC field coil 33. The second stator 24 has a ferromagnetic frame 35 with slots therein in which is wound an AC coil 36 and a DC field coil 37. The two stators 23 and 24 are mounted in the machine axially adjacent to a rotor 40 which has a first circumferentially extending outer row 41 of alternating permanent magnets 42 and iron pole pieces 43 and a second, inwardly spaced, circumferentially extending row 45 of alternating permanent magnet segments 47 and iron pole pieces 48. The permanent magnet and iron pole piece segments are separated by a support 50, as best shown in FIG. 4. Support 50 is formed of a non-ferromagnetic material such as aluminum, epoxy, etc. No back iron is provided. Rotor 40 includes a hub 52 with a central opening through which the shaft 28 can be inserted for mounting of the rotor 40 onto the shaft.

Figure 5:
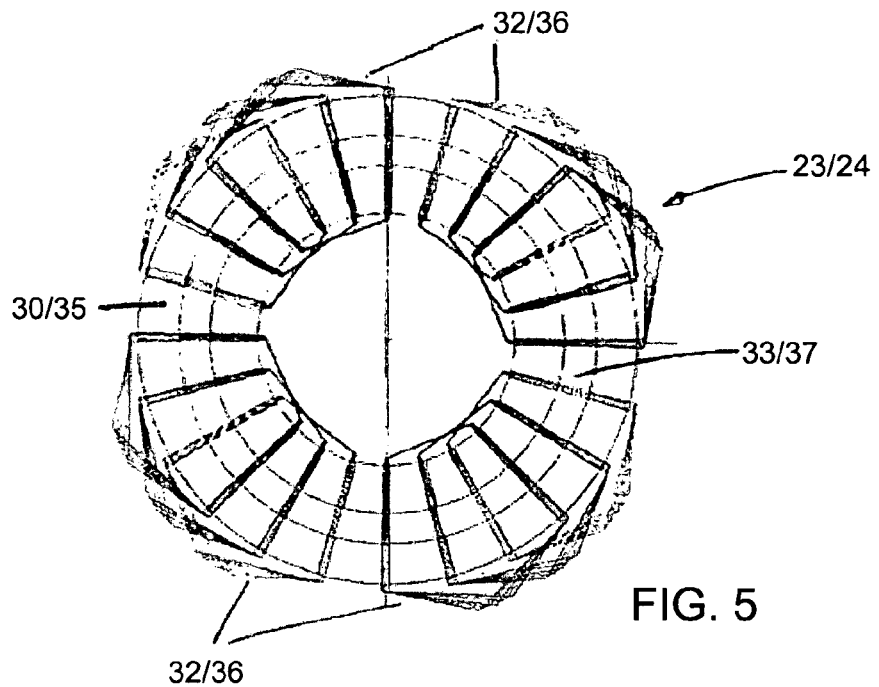
FIG. 5 is a two-dimensional view of the stator of the machine of FIG. 1 illustrating an example of a three phase winding structure for the machine.
Figure 6:
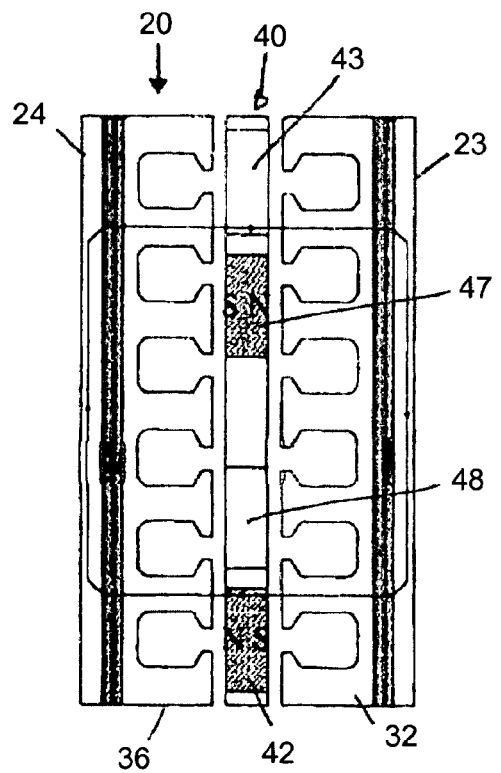
FIG. 6 is a schematic cross-sectional view of the machine of FIG. 1 illustrating the main magnet flux paths through the rotor and stators.

FIG. 5 shows an example of a three phase winding structure for the windings 32 and 36 of the stators 23 and 24, and also illustrates the position of the circumferentially wound DC field windings 33 and 37 in the middle of the stator frames 30 and 35. The flux paths for the machine 20 are shown in the schematic cross-sectional view of FIG. 6, illustrating that the magnet flux paths extend from the permanent magnet of each of the inner and outer rows 41, 45 of the rotor through the stator frames 30 and 35, and bridging the two stators 23, 24 through the iron pole pieces 43, 48.

Figure 7:
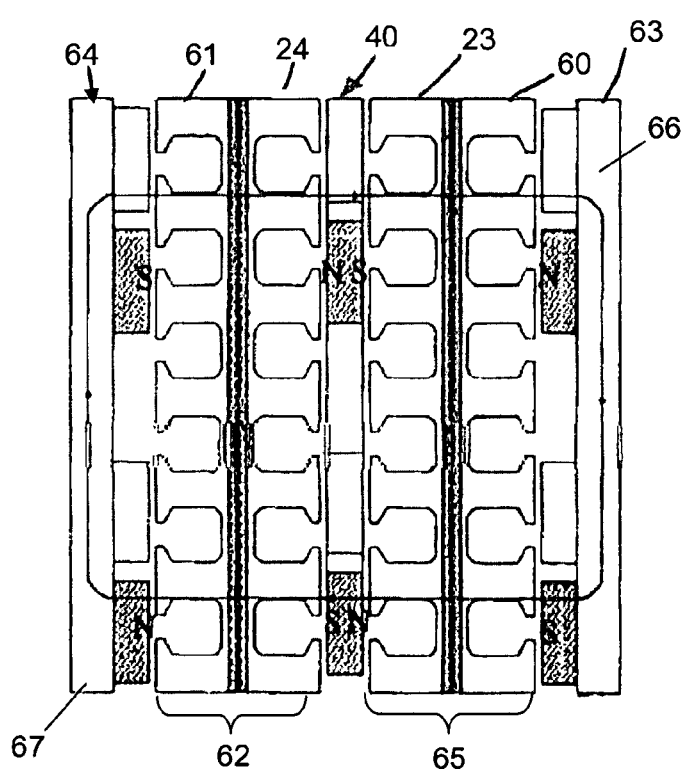
FIG. 7 is a schematic cross-sectional view of a modified machine having additional external stators and rotors and illustrating the main magnet flux paths therein.

The machine of the invention can be extended to multiple rotors as illustrated in FIG. 7. The machine of FIG. 7 has, in addition to the inner rotor 40, a first stator 62 including a first slot side 61 and a second slot side 24 on opposed sides and a second stator 65 including a third slot side 23 and a fourth slot side 60 on opposed sides. Second slot side 24 and third slot side 23 face opposed sides of inner rotor 40. Additional rotors 63 and 64 are mounted outwardly of fourth slot side 60 and first slot side 61, respectively, and each include a back iron 66, 67, respectively. The stators 60 and 61 may be formed identically to the stators 23 and 24. Rotors 63 and 64 may be formed identically to each other. Inner rotor 40, however, does not include a back iron. In this case, the flux paths extends through all of the stators to form a continuous loop between the two outer rotors 63 and 64. Each of the rotors 40, 63, and 64 is mounted to shaft 28 at the central axis (not shown in FIGS. 6 and 7).

Figure 14:
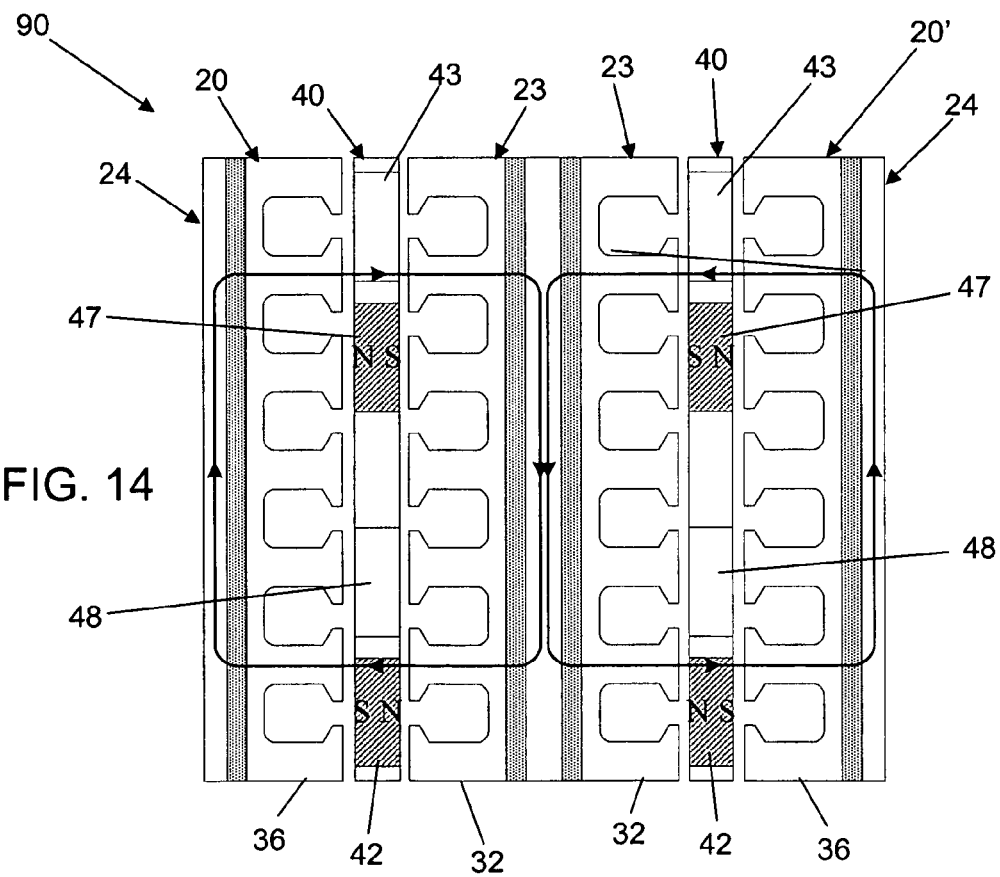
FIG. 14 is a schematic cross-sectional view of a second modified machine illustrating the main magnet flux paths therein.

The machine of the invention can be extended to include permanent magnet machine 90 as illustrated in FIG. 14. The machine 90 of FIG. 14 includes the machine 20 and a parallel mounted machine 20'. Machine 20' may be formed identically to machine 20. Machine 20' is arranged to form a mirror image of machine 20 so that the magnetic flux flows in the same direction given a similar excitation. In effect, machine 20' is rotated 180° and placed adjacent machine 20. Thus, in this case, the flux paths extends through only the stators associated with each machine 20, 20'. Each of the rotors 40 is mounted to shaft 28 at the central axis (not shown in FIG. 14). In an exemplary embodiment, the center stators 23, 23 may be a one piece stator having slots on both sides. Each side of the one piece stator includes a stator with AC drive winding 32 and a DC field coil 33.

The principles of field weakening operation in the machine of the present invention may be illustrated with reference to FIGS. 8-12. DC field coils 33/37 are on AC drive winding 32 of the machine 20. In contrast to conventional field weakening techniques, a DC field winding 399 is used to magnetize the iron poles 43, 48 of rotor 40. The iron poles have no polarity on their own and are effectively electrically magnetized magnets. If DC field winding 399 is excited with a current magnitude and direction in a manner such that the iron poles are magnetized, and the flux from the permanent magnets 42, 47 equals the flux from the iron poles, the machine essentially is similar to a conventional permanent magnet machine. Flux in the iron poles depends on the magnitude of the current in the DC field coils 33/37. Depending on the magnitude and direction of the excitation, the air gap flux is either increased or reduced.

Figure 8:
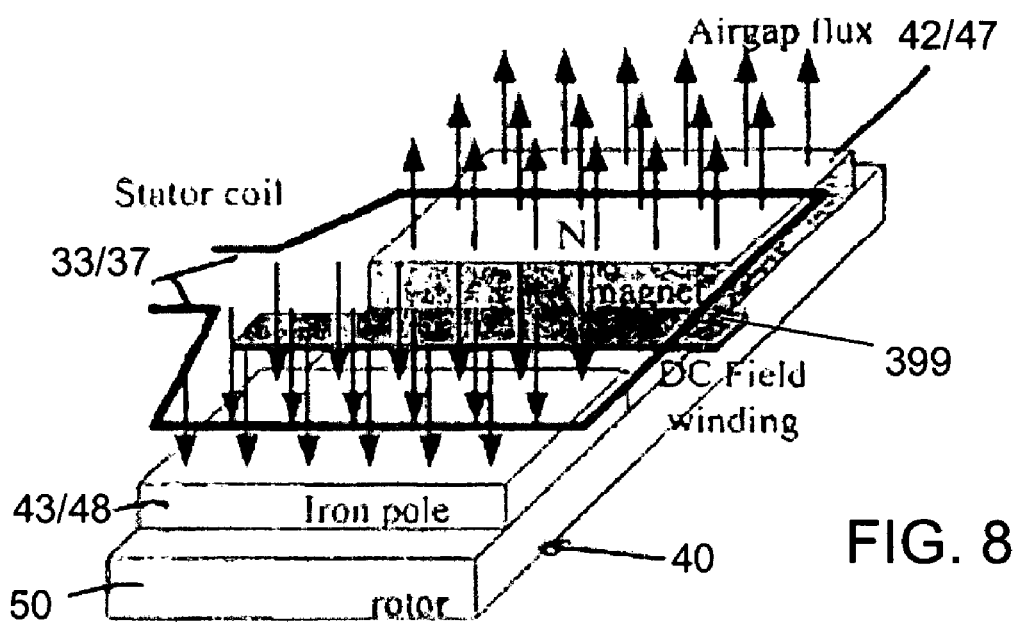
FIG. 8 is a schematic view illustrating the flux in a section of the machine of FIG. 1 with positive field current in the DC field winding.
Figure 9:
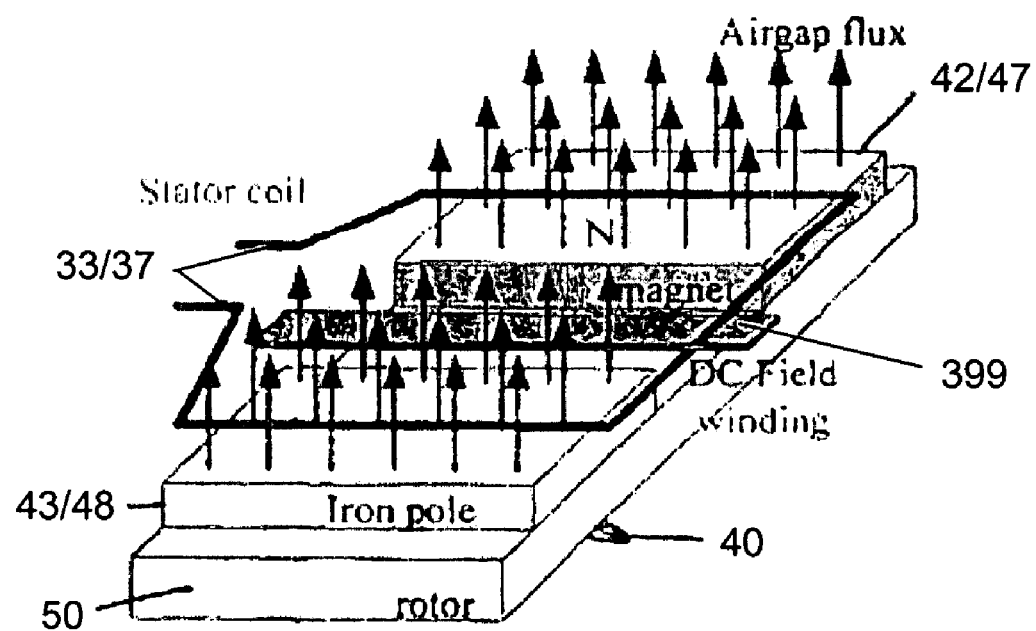
FIG. 9 is a view as in FIG. 8 illustrating the flux with negative field current in the DC field winding.

FIG. 8 illustrates the air gap flux schematically with positive field current and FIG. 9 illustrates the air gap flux with negative current. By selecting the current level of the DC excitation in the DC field coils 33/37, the air gap flux densities can be selected as desired, and the induced EMF is reduced or increased from what it would be without the stator coil excitation. The shape and position of the permanent magnets and the iron pole pieces can be chosen to reduce the effect of harmonics. Additionally, the flux generated from the permanent magnets 42, 47 is not affected by the flux generated by the DC field coils 33/37.

Figure 10:
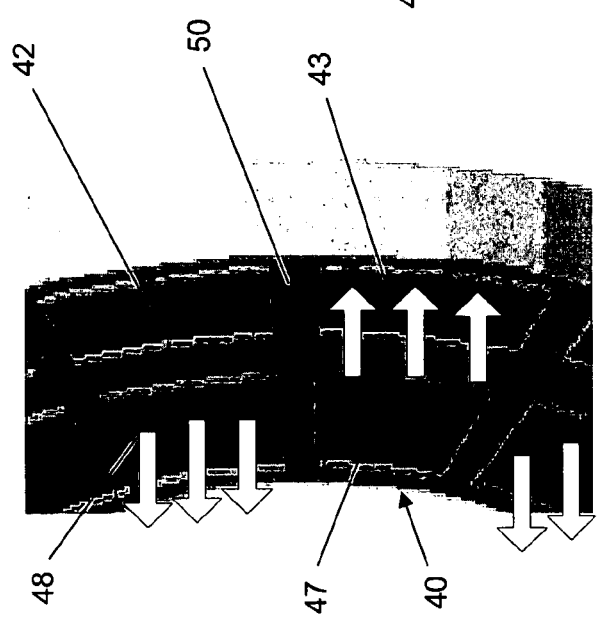
FIG. 10 is a view of a portion of the rotor of the machine of FIG. 1 illustrating the air gap flux directions with no DC field winding current.
Figure 11:
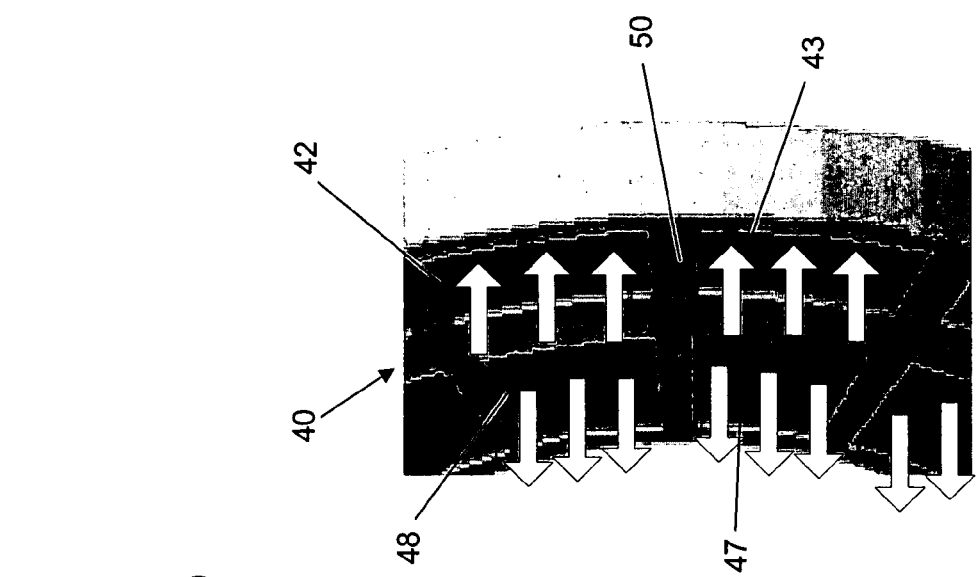
FIG. 11 is a view as in FIG. 10 with positive DC field winding current.
Figure 12:
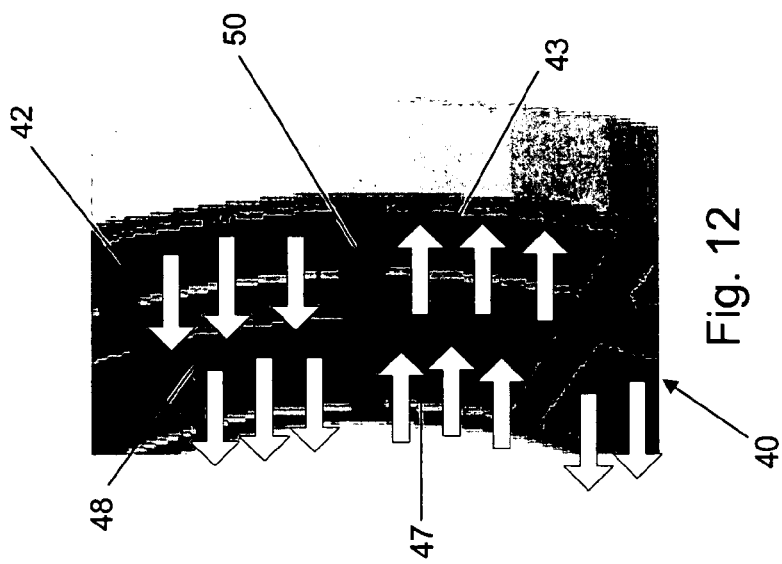
FIG. 12 is a view as in FIG. 10 with negative DC field winding current.

FIGS. 10-12 illustrate the directions of the air gap flux at the permanent magnets 42 and 47 and the ferromagnetic pole pieces 43 and 48 for the rotor 40 of the machine 20. FIG. 10 illustrates the air gap flux with no field winding current, FIG. 11 illustrates the air gap flux with positive field winding current, and FIG. 12 illustrates the air gap flux with negative field winding current. When a positive current is applied to the field winding, the average air gap flux is reduced, since the flux directions above the permanent magnets and the iron pieces are in the opposite direction. When the direction of the field current is changed so that it is negative, the flux direction above the iron pole pieces changes and the flux created by the DC field winding is added to the flux from the permanent magnets. Thus, excitation from the DC field winding polarity tends to increase the flux on both the inner and outer portions of the rotor pole, strengthening the magnetic field and increasing the flux linking the stator AC windings, while excitation of the field winding with the opposite polarity decreases the flux and the consequent poles in the inner and outer portions of the rotor, thereby achieving field weakening.

Figure 13:
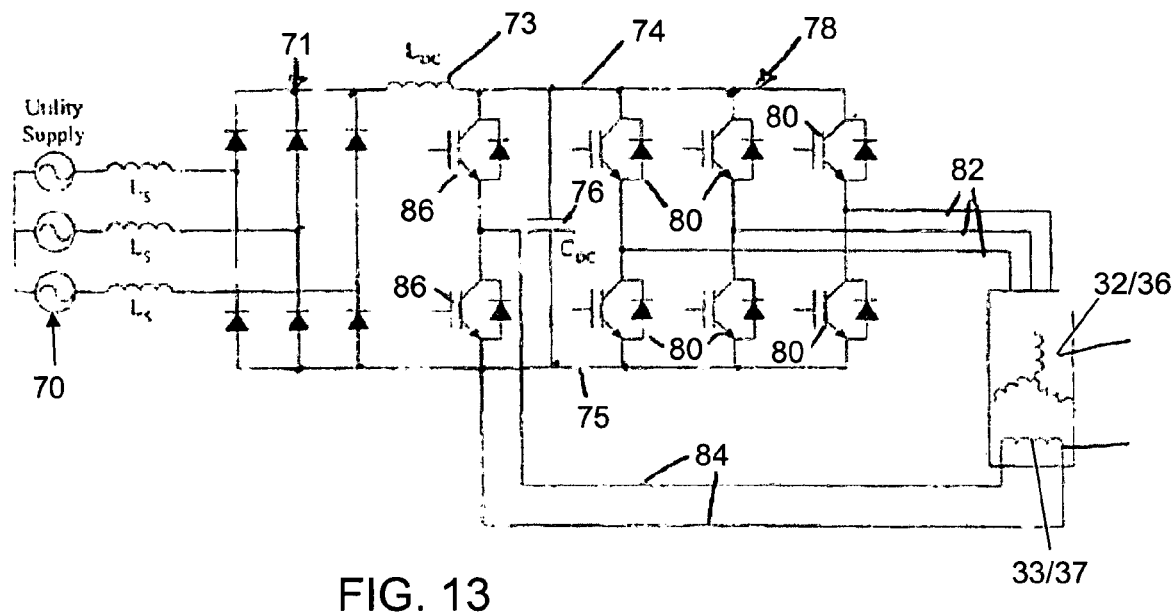
FIG. 13 is a schematic circuit diagram of an exemplary electrical power supply for the machine of FIG. 1 which provides both AC stator winding power and DC field winding power.

An exemplary circuit for providing power to the AC windings and the DC field windings of the machine 20 is shown in FIG. 13, although it is understood that any other electrical supply may be utilized that provides a suitable output power, including separate AC and DC power supplies. In the exemplary active control circuit of FIG. 13, the power from a utility supply 70 is provided to a rectifying bridge 71 which provides DC output current through a DC link inductor 73 to DC bus lines 74 and 75. A capacitor 76 is connected across the DC bus lines 74 and 75, and the power from the DC bus lines is received by an inverter 78 formed of controlled switching devices 80, such as insulated gate bipolar transistors (IGBTs). Output lines 82 from the inverter 78 are connected to the AC stator windings 32 and 36 of the machine 20, in series or parallel as appropriate. In addition to providing AC power, the DC power on the bus lines 74 and 75 may also be provided to the DC field windings 33 and 37 via output lines 84. Switching devices 86 are preferably connected across the DC bus lines 74 and 75, with the node between the switching devices 86 connected to one of the lines 84, allowing selective control of the power provided on the lines 84 to the DC field windings. Utilizing DC power from the DC link from the inverter rather than providing power from a separate DC power supply, allows active control of the motor while eliminating the need for extra power supplies for the field winding. Other converter topologies are possible as known to those skilled in the art. For example, a DC winding from an external source may be used.

It is understood that the invention is not confined to the particular embodiments set forth herein as illustrative, but embraces all such forms thereof as come within the scope of the following claims.

What is claimed is:
1. An electrical machine, comprising:
a first rotor mounted for a rotation about a central axis, the first rotor comprising
a first row arranged circumferentially, the first row comprising a first plurality of permanent magnets and a first plurality of ferromagnetic pole pieces, the first plurality of permanent magnets and the first plurality of ferromagnetic pole pieces arranged in an alternating sequence and separated by a first non-ferromagnetic material; and
a second row arranged circumferentially with the second row spaced radially inwardly from the first row, the second row comprising a second plurality of permanent magnets and a second plurality of ferromagnetic pole pieces, the second plurality of permanent magnets and the second plurality of ferromagnetic pole pieces arranged in an alternating sequence and separated by a second non-ferromagnetic material;
wherein the first plurality of permanent magnets are radially adjacent to the second plurality of ferromagnetic pole pieces, and further wherein the first plurality of permanent magnets are arranged to have an opposite polarity of the second plurality of permanent magnets;
a first stator mounted axially adjacent to a first side of the first rotor, the first stator including
a first ferromagnetic stator frame;
a first AC winding wound on the first ferromagnetic stator frame; and a first DC field winding wound in circumferential slots in the first ferromagnetic stator frame;

a second stator mounted axially adjacent to a second side of the first rotor, the second side of the first rotor opposite the first side of the first rotor, the second stator including
a second ferromagnetic stator frame;
a second AC winding wound on a first side of the second ferromagnetic stator frame;
a second DC field winding wound in circumferential slots in the first side of the second ferromagnetic stator frame;
a third AC winding wound on a second side of the second ferromagnetic stator frame, the second side of the second ferromagnetic stator frame opposite the first side of the second ferromagnetic stator frame; and
a third DC field winding wound in circumferential slots in the second side of the second ferromagnetic stator frame;

a second rotor axially adjacent to the second side of the second ferromagnetic stator frame mounted for a rotation about the central axis, the second rotor comprising
a third row arranged circumferentially, the third row comprising a third plurality of permanent magnets and a third plurality of ferromagnetic pole pieces, the third plurality of permanent magnets and the third plurality of ferromagnetic pole pieces arranged in an alternating sequence and separated by a third non-ferromagnetic material; and
a fourth row arranged circumferentially with the fourth row spaced radially inwardly from the third row, the fourth row comprising a fourth plurality of permanent magnets and a fourth plurality of ferromagnetic pole pieces, the fourth plurality of permanent magnets and the fourth plurality of ferromagnetic pole pieces arranged in an alternating sequence and separated by a fourth non-ferromagnetic material;
wherein the third plurality of permanent magnets are radially adjacent to the fourth plurality of ferromagnetic pole pieces, and further wherein the third plurality of permanent magnets are arranged to have an opposite polarity of the fourth plurality of permanent magnets; and a third stator mounted axially adjacent the second rotor opposite the second stator, the third stator including
a fourth ferromagnetic stator frame;
a fourth AC winding wound on the fourth ferromagnetic stator frame; and
a fourth DC field winding wound in circumferential slots in the fourth ferromagnetic stator frame;
wherein the first plurality of permanent magnets are arranged to have an opposite polarity of the third plurality of permanent magnets.

2. The electrical machine of claim 1 wherein the non-magnetic material of the rotor is selected from the group consisting of aluminum and epoxy.

3. The electrical machine of claim 1 wherein the permanent magnet segments are formed of NdFeB.

4. The electrical machine of claim 1 wherein the permanent magnet segments are formed of SmCo.

5. The electrical machine of claim 1 wherein the N-S axial orientation of the permanent magnet segments in the first row of the rotor are opposite to the N-S axial orientation of the permanent magnet segments in the second row of the rotor.

6. The electrical machine of claim 1 wherein the ferromagnetic pole pieces of the rotor are formed of iron.

7. The electrical machine of claim 1 wherein the ferromagnetic pole pieces of the rotor are formed of a soft magnetic composite material.

8. The electrical machine of claim 7 wherein the soft magnetic composite material is powdered iron.

9. The electrical machine of claim 1 wherein the first AC winding is a three-phase winding.

10. The electrical machine of claim 1 wherein the second stator comprises two stators axially adjacent each other.

11. An electrical machine, comprising:
a first rotor mounted for a rotation about a central axis, the first rotor comprising
a first backing;
a first row arranged circumferentially on the first backing, the first row comprising a first plurality of permanent magnets and a first plurality of ferromagnetic pole pieces, the first plurality of permanent magnets and the first plurality of ferromagnetic pole pieces arranged in an alternating sequence; and
a second row arranged circumferentially on the first backing with the second row spaced radially inwardly from the first row, the second row comprising a second plurality of permanent magnets and a second plurality of ferromagnetic pole pieces, the second plurality of permanent magnets and the second plurality of ferromagnetic pole pieces arranged in an alternating sequence;
wherein the first plurality of permanent magnets are radially adjacent to the second plurality of ferromagnetic pole pieces, and further wherein the first plurality of permanent magnets are arranged to have an opposite polarity of the second plurality of permanent magnets;

a first stator mounted axially adjacent to a first side of the first rotor, the first stator including
a first ferromagnetic stator frame;
a first AC winding wound on a first side of the first ferromagnetic stator frame;
a first DC field winding wound in circumferential slots in the first side of the first ferromagnetic stator frame;
a second AC winding wound on a second side of the first ferromagnetic stator frame, the second side of the first ferromagnetic stator frame opposite the first side of the first ferromagnetic stator frame; and
a second DC field winding wound in circumferential slots in the second side of the first ferromagnetic stator frame;

a second rotor axially adjacent to the second side of the first ferromagnetic stator frame opposite the first rotor and mounted for a rotation about the central axis, the second rotor comprising
a third row arranged circumferentially, the third row comprising a third plurality of permanent magnets and a third plurality of ferromagnetic pole pieces, the third plurality of permanent magnets and the third plurality of ferromagnetic pole pieces arranged in an alternating sequence and separated by a first non-ferromagnetic material; and
a fourth row arranged circumferentially with the fourth row spaced radially inwardly from the third row, the fourth row comprising a fourth plurality of permanent magnets and a fourth plurality of ferromagnetic pole pieces, the fourth plurality of permanent magnets and the fourth plurality of ferromagnetic pole pieces arranged in an alternating sequence and separated by a second non-ferromagnetic material;

wherein the third plurality of permanent magnets are radially adjacent to the fourth plurality of ferromagnetic pole pieces, and further wherein the third plurality of permanent magnets are arranged to have an opposite polarity of the fourth plurality of permanent magnets;

a second stator mounted axially adjacent to a first side of the second rotor opposite the first stator, the second stator including a second ferromagnetic stator frame;

a third AC winding wound on a first side of the second ferromagnetic stator frame;

a third DC field winding wound in-circumferential slots in the first side of the second ferromagnetic stator frame;

a fourth AC winding wound on a second side of the second ferromagnetic stator frame, the second side of the second ferromagnetic stator frame opposite the first side of the second ferromagnetic stator frame; and a fourth DC field winding wound in circumferential slots in the second side of the second ferromagnetic stator frame; and a third rotor axially adjacent to the second side of the second ferromagnetic stator frame opposite the second stator mounted for a rotation about the central axis, the third rotor comprising a second backing;

a fifth row arranged circumferentially on the second backing, the fifth row comprising a fifth plurality of permanent magnets and a fifth plurality of ferromagnetic pole pieces, the fifth plurality of permanent magnets and the fifth plurality of ferromagnetic pole pieces arranged in an alternating sequence; and a sixth row arranged circumferentially on the second backing with the sixth row spaced radially inwardly from the fifth row, the sixth row comprising a sixth plurality of permanent magnets and a sixth plurality of ferromagnetic pole pieces, the sixth plurality of permanent magnets and the sixth plurality of ferromagnetic pole pieces arranged in an alternating sequence;

wherein the fifth plurality of permanent magnets are radially adjacent to the sixth plurality of ferromagnetic pole pieces, and further wherein the fifth plurality of permanent magnets are arranged to have an opposite polarity of the sixth plurality of permanent magnets;

wherein the first plurality of permanent magnets are arranged to have an opposite polarity of the fifth plurality of permanent magnets.

12. The electrical machine of claim 11 wherein the nonmagnetic material of the rotor is selected from the group consisting of aluminum and epoxy.

13. The electrical machine of claim 11 wherein the permanent magnet segments are formed of NdFeB.

14. The electrical machine of claim 11 wherein the permanent magnet segments are formed of SmCo.

15. The electrical machine of claim 11 wherein the N-S axial orientation of the permanent magnet segments in the first row of the rotor are opposite to the N-S axial orientation of the permanent magnet segments in the second row of the rotor.

16. The electrical machine of claim 11 wherein the ferromagnetic pole pieces of the rotor are formed of iron.

17. The electrical machine of claim 11 wherein the ferromagnetic pole pieces of the rotor are formed of a soft magnetic composite material.

18. The electrical machine of claim 17 wherein the soft magnetic composite material is powdered iron.

19. The electrical machine of claim 11 wherein the first AC winding is a three-phase winding.

* * * * *

UNITED STATES PATENT AND TRADEMARK OFFICE
CERTIFICATE OF CORRECTION

| | | |
|---|---|---|
| PATENT NO. | : 7,608,965 B2 | Page 1 of 1 |
| APPLICATION NO. | : 11/218316 | |
| DATED | : October 27, 2009 | |
| INVENTOR(S) | : Aydin et al. | |

It is certified that error appears in the above-identified patent and that said Letters Patent is hereby corrected as shown below:

On the Title page,

[*] Notice:   Subject to any disclaimer, the term of this patent is extended or adjusted under 35 U.S.C. 154(b) by 318 days.

Delete the phrase "by 318 days" and insert -- by 808 days --

Signed and Sealed this

Fifteenth Day of June, 2010

David J. Kappos
*Director of the United States Patent and Trademark Office*